(12) United States Patent
Atkinson

(10) Patent No.: US 6,231,662 B1
(45) Date of Patent: May 15, 2001

(54) SURFACE TREATMENTS FOR TITANIUM DIOXIDE AND OTHER INDUSTRIAL PIGMENTS

(76) Inventor: George K. Atkinson, P.O. Box 1684, Laurel, MS (US) 39441

( * ) Notice: Subject to any disclaimer, the term of this patent is extended or adjusted under 35 U.S.C. 154(b) by 0 days.

(21) Appl. No.: 09/427,129

(22) Filed: Oct. 25, 1999

(51) Int. Cl.$^7$ .............................. C09C 1/00; C09C 1/36; C09C 1/44; C09C 1/48
(52) U.S. Cl. .................... 106/499; 106/436; 106/437; 106/448; 106/477; 106/493; 106/504; 554/1; 554/103; 554/104; 554/115; 554/121; 554/122; 554/185; 585/3; 585/4; 585/5
(58) Field of Search ......................... 106/436, 437, 106/448, 477, 493, 499, 504; 554/1, 103, 104, 115, 121, 122, 185; 585/3, 4, 5

(56) References Cited

U.S. PATENT DOCUMENTS 3,928,276 * 12/1975 Linden et al. ..................... 260/34.2
4,148,605 * 4/1979 Andress, Jr. ........................... 422/7

* cited by examiner

Primary Examiner—Mark L. Bell
Assistant Examiner—Michael J. DiVerdi
(74) Attorney, Agent, or Firm—Herbert M. Hanegan

(57) ABSTRACT

An additive for enhancing the performance of industrial pigments. The additive improves dispersibility and is the reaction product of an amine, a fatty amine, and a polybasic acid.

18 Claims, No Drawings

SURFACE TREATMENTS FOR TITANIUM DIOXIDE AND OTHER INDUSTRIAL PIGMENTS

This invention relates to surfactant treated particulate titanium dioxide and other pigments. More particularly, this invention is concerned with surfactant treated titanium dioxide and other particulate materials readily employable in coating compositions, plastic molding compositions, reinforced plastic composite compositions, and paper making compositions.

Industrial pigment particles agglomerate or cake together into hard packed clusters during the drying operation near the end of the manufacturing process. Forces holding pigment clusters together are not large in many cases but are yet large enough that the pigment user, those who incorporate industrial pigments into their products such as paints and plastics and the like, are required to subject industrial pigments to a milling operation in which the agglomerates are sheared under stress into particles of suitable smallness and homogenized into the matrix or product which incorporates them. The process is dispersion.

Pigment dispersion is a bottleneck, a limiting requirement, and the most expensive operation in terms of energy and time in manufacturing processes which employ pigments. This present invention is concerned with the employment of surfactants for the surface treatment of pigments during the pigment manufacturing process in order to provide pigments of improved dispersibility in subsequent manufacturing processes and in some cases, to provide improvements in certain important aspects of products incorporating these surface treated pigments.

Titanium dioxide pigments present a special case. Uncoated titania pigments are extremely difficult to disperse. In addition, their employment in pigmented plastics, coatings, papers, and fiber compositions induces a photoactivity which results in oxidative degradation which is destructive of the materials of which they are a part. As a consequence, most titanium dioxide pigments are provided with some form of surface coating during manufacture to promote dispersibilty and to reduce photoactivity. Two materials in widespread use at present are silica and alumina. These materials are coated onto the surfaces of pigment particles in the range of three to ten percent by weight of $TiO_2$.

The surface treatment of pigments can provide the following beneficial primary effects:

1. The total number of agglomerates is reduced.
2. Any agglomerates that are present are more easily broken up since their mechanical strength is reduced.
3. Pigment particle wettability is improved due to a lowering of the interfacial tension between the pigment surface and the application medium.
4. Wettability of the pigment particles is also improved due to the liberation of the free energy of solution of the coating agent on the pigment surface. (Surface Treatment of Organic Pigments; K. Merkle and H. Schafer; Pigment Handbook, page 158, Vol. III; John Wiley and Sons, Inc., 1973.)

Pigments, their preparation and properties are described in volumes I, II and III of the book "Pigment Handbook" published by John Wiley & Sons, Inc. The uses, preparation and characterization of pigments is further described in the various units of "The Federation Series on Coating Technology" published by the Federation of Societies for Coating Technology.

German Pat. Nos. 889,042 and 930,998 teach the use of surface-active substances as emulsifiers together with oils in the manufacture of water-insoluble azo-dyestuffs having a soft grain.

U.S. Pat. No. 3,120,508 discloses that water-insoluble azo-dyestuffs having a particularly high tinctorial strength can be prepared by adding during the coupling cationic surface-active compounds without simultaneously using oils.

U.S. Pat. No. 3,437,502 teaches improvement of opacity and dispersibility of titanium dioxide through surface treatment with silica and alumina. U.S. Pat. No. 3,658,566 teaches the production of titanium dioxide of improved properties by treatment with oxides of silicon and aluminum. U.S. Pat. No. 4,599,114 discloses improvement ofpigmentary properties for a variety of pigments through surface treatment of pigment filter cakes.

Cationic surface-active compounds are described in the book "Surface-Active Agents and Detergents" by A. M. Schwartz, J. W. Perry and J. Berch, vol. 11 (1958), pages 103 to 119.

U.S. Pat. Nos. 4,599,114, 4,471,780, and 4,909,852 disclose compositions having surfactants consisting of the reaction product of a diamine, a carboxylic acid and a fatty acid. U.S. Pat. No. 5,808,118 discloses a composition which is the reaction product of a diamine, a sulfonic acid and a fatty acid.

British Patent No. 1,080,115 discloses the use of primary long chain alkyl amines for treating pigments improving their dispersibility.

Suitable cationic surface-active substances are, for example, long-chained aliphatic amino compounds that contain about 10 to 18 carbon atoms, or the salts of such nitrogen compounds with carboxylic acids, such as for example, formic acid, acetic acid, oleic acid, tallow fatty acid, lactic acid or mineral acids, for example, hydrochloric acid. Fatty amines are for example, coconut oil amine, oleyl amine, stearyl amine, and tallow fat amine, as well as the secondary and tertiary amines or quaternary ammonium compounds derived therefrom that may carry as substituents aliphatic, aromatic or oxethylated radicals, for example, alkyldimethyloxyethyl ammonium chloride. Oxethylated fatty amines in their secondary, tertiary or quaternary form are also suitable. Also useful are the condensation products of long-chained, in some cases also unsaturated, carboxylic acids with amines, in particular alkylenediamines, alkylenetriamines, or alkylenepolyamines containing alkylene radicals oflow molecular weight, for example, ethylene diamine, diethylene triamine, etc., as well as the secondary, tertiary or quaternary amines formed by alkylation of the condensation products, especially in the form of their water-soluble salts with the above-mentioned acids. Further, there may be used fatty acid amides and esters of long-chained carboxylic acids with alkylol amines, for example, triethanolaminoleate, stearate, and the like, further also cyclical, nitrogen-containing compounds, for example, long-chained derivatives of morpholine, imidazoline, piperidine, piperazine or pyridine. The above-mentioned amino compounds are used preferably in the form of their carboxylic or hydrochloric salts.

There is described herein the use of surfactants which have the capability of increasing the dispersibility of titanium dioxide and other pigments to which they are applied.

Titanium dioxide is an established pigmentary material which can also be employed as a reinforcing filler, albeit an expensive one. It is commonly made by two processes, the chloride process and the sulfate process. The chloride process is dry process wherein $TiCl_4$ is oxidized to $TiO_2$ particles. In the sulfate process titanium sulfate, in solution, is converted by a metathesis reaction to insoluble and particulate titanium dioxide. In both processes, particle formation can be seeded by aluminum compounds. Thereafter, the processes are essentially the same. The TiO$_2$ particles in a water slurry are put through multiple hydroseparations to separate out the large particles and the further refined pigment in slurry form is passed to a treating tank where the particles may be treated with an aluminum compound and/or silicon compound, such as aluminum triethoxide, sodium aluminate, aluminum trichloride, aluminum sulfate, ethyl silicate, sodium silicate, silicon tetrachloride, trichlorosilane, and the like. By pH adjustment, the pigment is flocculated and precipitated with its coating of alumina and/or silica, or without any coating. It is then made into a filter cake by a vacuum drying and further dried in an oven, generally of a vibrating type. The optimum average particle size can range from about 0.05 to about 0.35 microns with a range of about 0.1 to about 0.25 more preferable.

One feature of the dispersion promoters of this invention is that they alter the surface characteristics of the titanium dioxide or other pigments so that it is more readily and more thoroughly dispersed within the resin or plastic in which it is incorporated, and this serves to enhance the appearance of the resulting composite and increase the overall strength of the composite when the particulate material employed is one which serves to reinforce the plastic or resin.

The amount of dispersion promoter provided upon the titanium dioxide particles, as characterized herein, is that amount which alters the surface characteristics of the particles so that they are more readily dispersed within the resin, plastic, paper making composition or other medium in which they are incorporated. Typically, the amount of the dispersion promoter which is supplied to the titanium dioxide may be from as little as about 0.25 weight percent to about 5 weight percent, based upon the weight of the titanium dioxide particles. As a rule, about 0.5 to about 3 weight percent of the dispersion promoter and/or its derivatives is adequate for the purposes of appropriately altering the surface characteristic of the particles. Preferred is 2%. Most preferred is 2 or less weight percent for titanium dioxide and inorganic color pigments, 1 or less weight percent for inert pigments, and much higher amounts for the organic and carbon black pigments which have very high surface areas. For some pigment and mediums the amount of dispersion promoter may be from about 1.00 to about 15.0 percent or higher.

The amount of dispersion promoter provided when used with carbon black particles, as characterized herein, is that amount which alters the surface characteristics of the particles so that they are more readily dispersed within the resin, plastic, paper making composition or other medium in which they are incorporated. Typically, the amount of the dispersion promoter which is supplied to the carbon black may be from as little as about 1.00 weight percent to about 15.0 weight percent, based upon the weight of the carbon black particles. As a rule, about 4.0 to about 10.0 weight percent of the dispersion promoter and/or its derivatives is adequate for the purposes of appropriately altering the surface characteristic of the particles. Most preferred is about 8.0 percent.

The amount of dispersion promoter provided when an organic pigment is used, as characterized herein, is that amount which alters the surface characteristics of the pigment so that it is more readily dispersed within the resin, plastic, paper making composition or other medium in which it is incorporate. Typically, the amount of the dispersion promoter which is supplied to the organic pigment may be from as little as about 1.00 weight percent to about 15.0 weight percent, based upon the weight of the organic pigment. As a rule, about 4.0 to about 10.0 weight percent of the dispersion promoter and/or its derivatives is adequate for the purposes of appropriately altering the surface characteristic of the pigment. Most preferred is about 4.0 percent.

The amount of dispersion promoter provided when inert pigments are used, as characterized herein, is that amount which alters the surface characteristics of the pigment so that it is more readily dispersed within the resin, plastic, paper making composition or other medium in which it is incorporated. Typically, the amount of the dispersion promoter which is supplied to the inert pigment may be from as little as about 0.25 weight percent to about 3 weight percent of the dispersion promoter and/or its derivatives which is adequate for the purposes of appropriately altering the surface characteristic of the pigment. Most preferred is 1%.

The amount of dispersion promoter provided when inorganic color pigments are used, as characterized herein, is that amount which alters the surface characteristics of the pigment so that it is more readily dispersed within the resin, plastic, paper making composition or other medium in which it is incorporated. Typically, the amount of the dispersion promoter which is supplied to the inorganic color pigments may be from as little as about 0.25 weight percent to about 5 weight percent of the dispersion promoter and/or its derivatives which is adequate for the purposes of appropriately altering the surface characteristic of the pigment. Most preferred is 2%.

The surfactants of this invention perform the role of dispersants when added directly to conventional paint formulations.

The dispersion promoter and/or its derivatives may be provided on the titanium dioxide particles by any of the known methods by which dispersion promoters are similarly supplied to particulate surfaces. Thus adding the dispersion promoter to the particles while tumbling, mixing the particles in a dilute liquid composition containing the dispersion promoter, or forming a slurry of the particles and dispersion promoter and drying, spray drying or the like represent adequate treating procedures.

The plastics and/or resin in which the titanium dioxide particles treated with the dispersion promoter and/or its derivatives include essentially any plastic and/or resin. Included in the definition of plastic are rubber compounds. The treated titanium dioxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic except, of course, it would not be desirable for any plastic or resin or any of the treated titanium dioxide to employ a solvent or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendaring, casting, compression, lamination, and/or transfer molding), coating (including lacquers, film bonding coatings, powder coatings, coatings containing only pigment and resin, and painting,) inks, dyes, tints, impregnations, adhesives, caulks, sealants, rubber goods, and cellular products. Thus the choice and use of the plastics and resins with the treated particles of this invention is essentially limitless. For simple illustration purposes, the plastics and resins may be alkyd resins, oil modified alkyd resins, unsaturated polyesters employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, EPDM rubbers, SBR rubbers, nitrile rubbers, natural rubbers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers) ethyl cellulose, the cellulose acetates and ethylene-vinyl acetate copolymers, ethylene-acrylic acid copolymers, ethylene-acrylate copolymers), and the like.

Most pigments go through an aqueous phase in manufacture in which the pigment particles are present at maximum fineness. This phase offers an ideal opportunity to contact the individual particles with a surface treating agent or surfactant with resulting important benefits to pigment dispersibility. The agents of the present invention are produced from a combination of the following materials described in the general formula:
  an amine or an alkanolamine
  a fatty amine or fatty diamine
  a dibasic acid or polybasic acid Advantageous amines which are used include 2-amino-2-methyl-1-propanol, monoethanolamine, diethanolamine, triethanolamine, n-butylamine, and ethylenediamine.

Advantageous fatty amines include coco amine, lauryl amine, soya amine, stearyl amine, tallow amine, ether amines, ether diamines, and ethoxylated amines.

Advantageous dibasic and polybasic acids include dimer and trimer $C_{18}$ fatty acids, glutaric acid, succinic acid, and adipic acid.

Particularly good results were achieved through combining one equivalent of monoethanolamine and one equivalent of coco amine with two equivalents of polymerized $C_{18}$ fatty acid containing 36 carbon atoms. (Formula A). Another surfactant which gave outstanding pigmentary properties was produced through combining one equivalent of 2-amino-2-ethyl-1-propanol and three equivalents of coco amine with four equivalents of $C_{36}$ dimer acid (Formula B). Yet another advantageous surfactant was produced by combining one equivalent of ethylenediamine and three equivalents of an ethoxylated coco amine with four equivalents of $C_{36}$ dimer acid (Formula C). Many other advantageous surfactants are possible. Selected surfactants of this invention give excellent results when added to the grind step of conventional pigment dispersions. Selected surfactants of this invention are also useful in enhanced oil recovery.

In some instances the advantages provided by the surface treating agents of this invention are enhanced if the pigment particles are first exposed to minute amounts of materials of high charge density which bind to pigment surfaces and then act to attract the surface treating agents and bind them more closely and with more complete coverage to the pigment particle surfaces. Strong acids and bases act in this manner. Aluminum chloride (28% in water) added at the rate of one-tenth of one percent of dry weight of pigment enhanced the performance of Formula A when added to the pigment slurry and mixed prior to adding Formula A. In some instances, strong bases such as 2-amino-2-methyl-1-propanol can be used advantageously. Depending on the pigment and surfactant being used, the surfactant may also be added alone without any prior treatment.

Though this invention has been described in detail, the following examples are provided by way of illustration.

EXAMPLE I

Titanium Dioxide-Filter Cake (57% Solids)

One percent (based on dry weight of pigment) of Formula A (one equivalent of monoethanolamine and one equivalent of coco amine combined with two equivalents of $C_{36}$ dimer acid) was added to titanium dioxide slurry (ASTM 476-73 1988. Type II, III, IV) previously treated with 0.1 percent aluminum chloride (28% in water) based on dry weight of pigment. The slurry was mixed for optimal particle coverage and dried to recover the surface treated pigment. The dried pigment was suitable for dispersion in waterborne and solvent borne paint formulations.

EXAMPLE II

Titanium Dioxide Slurry (28% Solids)-No Inorganic Surface Treatment

One percent (based on dry weight of pigment) of Formula B (one equivalent of 2-amino-2methyl-1-propanol and three equivalents of coco amine combined with four equivalents of $C_{36}$ dimer acid) was added directly to a 28% titanium dioxide slurry which had received no previous inorganic surface treatment. The slurry was agitated and the dry pigment recovered. This pigment was suitable for dispersion in waterborne and solvent borne paint formulations.

EXAMPLE III

Phthalocyanine Blue-Filter Cake (45% Solids)

Four percent (based on dry weight of pigment) of Formula C (one equivalent of ethylenediamine and three equivalents of ethoxylated coco amine combined with four equivalents of $C_{36}$ dimer acid) was slurried with phthalocyanine blue filter cake and dried. The resulting surface treated pigment was suitable for dispersion in both waterborne and solvent borne inks.

EXAMPLE IV

Aluminum Trihydroxide-Filter Cake (50% Solids)

One percent (based on dry pigment weight) of Formula D (one equivalent of 2-amino-2-methyl-1-propanol and three equivalents of ethoxylated coco amine combined with four equivalents of $C_{36}$ dimer acid) was added to aluminum trihydroxide filter cake (median particle size 1.0 micron) and slurried. The dried pigment was suitable for dispersion in alkyd resins and EPDM rubber formulations.

EXAMPLE V

Dispersion Of Titanium Dioxide-Direct Addition Of Surfactant 400 ml plastic beaker-2" blade-2100 rpm
Grind portion:
  40 grams medium oil alkyd
  80 grams titanium dioxide
    (95% $TiO_2$- $Al_2O_3$ additive-Type II, III, IV)

2.0 grams Formula E (one equivalent n-butylamine and one equivalent of coco amine combined with two equivalents of $C_{36}$ dimer acid)

Grind is 7-8H in two minutes.

Add: 26.54 grams medium oil alkyd
18.75 grams mineral spirits
driers and antiskinning agent The surface treating agents of this invention perform as dispersants when used in conventional paint formulations.

What is claimed is:

1. A composition consisting of the reaction product of the simultaneous reaction of: an amine selected from the group consisting of 2-amino-2-methyl-1-propanol, monoethanolamine, diethanolamine, triethanolamine, n-butylamine, and ethylenediamine, a fatty amine, and a polybasic acid wherein the number of amine equivalents to acid equivalents is equal.

2. The composition of claim 1 wherein the number of amine equivalents and the number of fatty amine equivalents is equal.

3. The composition of claim 1 wherein the number of amine equivalents and the number of fatty amine equivalents is not equal.

4. The composition of claim 1 wherein the polybasic acid is a dimer acid.

5. The composition of claim 4 wherein the dimer acid is a polymerized fatty acid containing from about 36 to about 72 carbon atoms.

6. The composition of claim 5 wherein the polymerized fatty acid contains from about 36 to about 54 carbon atoms.

7. The composition of claim 5 wherein the polymerized fatty acid contains 36 carbon atoms.

8. The composition of claim 1 wherein the fatty amine contains from about 8 to about 24 carbon atoms.

9. The composition of claim 1 wherein the fatty amine is an ether amine.

10. The composition of claim 1 wherein the fatty amine is an ether diamine.

11. The composition of claim 1 wherein the polybasic acid is a trimer acid.

12. The composition of claim 11 wherein the trimer acid is a polymerized fatty acid containing from about 54 to about 72 carbon atoms.

13. The composition of claim 12 wherein the polymerized fatty acid contains 54 carbon atoms.

14. A process for enhancing the performance characteristics of inert pigments, inorganic color pigments, titanium dioxide, organic pigments, and carbon black comprising adding the composition of claim 1 to a slurry of the pigment and recovering the finished pigment.

15. The composition of claim 1 wherein the polybasic acid is glutaric acid.

16. The composition of claim 1 wherein the fatty amine is coco amine.

17. The composition of claim 1 wherein the fatty amine is stearyl amine.

18. The composition of claim 1 wherein the fatty amine is an ether diamine having from about 8 to about 30 carbon atoms.

\* \* \* \* \*